(12) United States Patent  
Jarrar et al.

(10) Patent No.: US 7,681,106 B2
(45) Date of Patent: Mar. 16, 2010

(54) ERROR CORRECTION DEVICE AND METHODS THEREOF

(75) Inventors: Anis M. Jarrar, Austin, TX (US); Jim C. Nash, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 734 days.

(21) Appl. No.: 11/392,321

(22) Filed: Mar. 29, 2006

(65) Prior Publication Data

US 2007/0234181 A1    Oct. 4, 2007

(51) Int. Cl.
G11C 29/00 (2006.01)
(52) U.S. Cl. ........................................ 714/763; 714/753
(58) Field of Classification Search ............ 714/6, 714/762, 752, 753, 763
See application file for complete search history.

(56) References Cited

U.S. PATENT DOCUMENTS 6,119,248 A * 9/2000 Merkin ........................ 714/52
7,426,672 B2 * 9/2008 Barrett et al. ................. 714/753
2004/0143769 A1 7/2004 Deng et al.
2005/0028015 A1 2/2005 Asano et al.
2005/0219903 A1 10/2005 Daga
2005/0283650 A1 * 12/2005 Zhang et al. .................. 714/6
2006/0143551 A1 * 6/2006 Biswas et al. ................. 714/726
2008/0148124 A1 * 6/2008 Zhang et al. ................. 714/752

OTHER PUBLICATIONS

PCT Search Report and Written Opinion from coordinating PCT Application No. PCT/U507/62533 mailed on Aug. 7, 2008.

* cited by examiner

*Primary Examiner*—Sam Rizk

(57) ABSTRACT

A method of error correction includes retrieving raw data from a memory device during a first operational phase of the error correction device. The raw data is retrieved by a bus interface device that interfaces with a variety of memory devices. During a second operational phase, the raw data is outputted from the bus interface device to the bus master. In addition, error correction data is calculated, and error correction is performed on the raw data during the second operational phase. By retrieving the raw data before performing error correction, and by outputting the raw data during the same operational phase, data may be retrieved from the memory more rapidly.

20 Claims, 2 Drawing Sheets

ERROR CORRECTION DEVICE AND METHODS THEREOF

FIELD OF THE DISCLOSURE

The present disclosure relates to error correction and more particularly to error correction for memory devices.

BACKGROUND

Memory devices, such as random access memory (RAM), flash memory, and hard disk drives, can contain storage errors. These errors can result from physical factors of the memory device or other factors. Memory errors can lead to erroneous data being read from the memory device, and frequent or repeated errors can result in poor device operation.

In order to reduce the impact of memory storage errors, a device can employ error correction techniques. For example, a memory device can store error correction code (ECC) data for memory locations in the memory device. The ECC data contains parity or other data that allows the device to detect errors. In addition, the ECC data can contain error correction data that allows the device to correct detected errors.

To improve memory reliability, error correction can be performed each time data is read from a memory. However, performing error correction can reduce system efficiency. For example, an error correction operation on 64 bits of data with eight error correction bits may require 20 or more levels of combinatorial logic. Thus, performing error correction can increase the data latency, or if operating in a pipelined system, the number of wait states experienced by a processor when reading from the memory.

Therefore, it is desirable to provide a device that performs error correction without undesirably reducing system efficiency.

BRIEF DESCRIPTION OF THE DRAWINGS

The use of the same reference symbols in different drawings indicates similar or identical items.

DESCRIPTION OF THE DRAWINGS

A device for error correction and methods thereof are disclosed. The method includes retrieving raw data from a memory device during a first operational phase of the error correction device. The raw data is retrieved by a bus interface device that interfaces with a variety of memory devices. During a second operational phase, the raw data is outputted from the bus interface device to the bus master. In addition, error correction data is calculated, and error correction is performed on the raw data during the second operational phase. By retrieving the raw data before performing error correction, and by outputting the raw data and correction the raw data during the same operational phase, data may be retrieved from the memory more rapidly.

Figure 1:
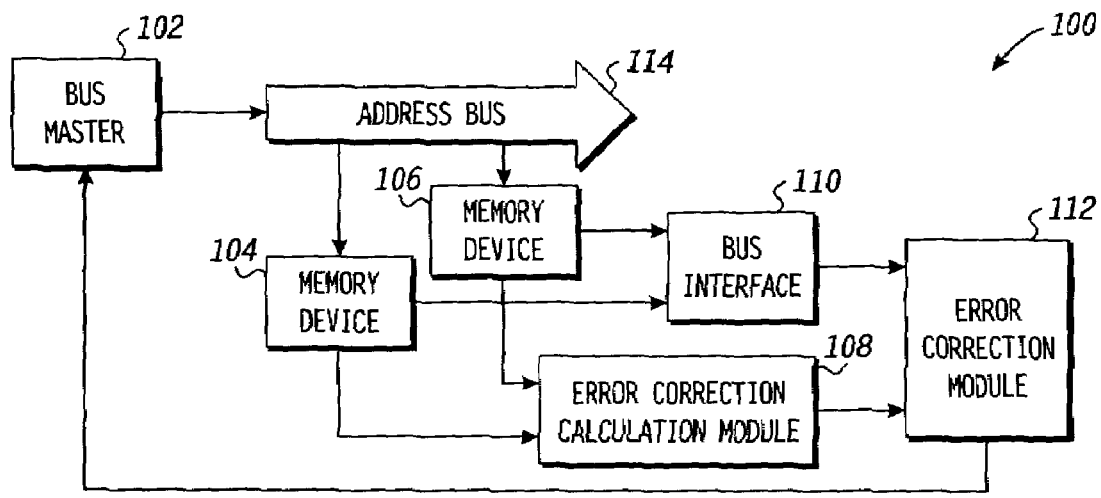
FIG. 1 is a block diagram of a particular embodiment of a device that performs error correction according to the present disclosure.

Referring to FIG. 1, a block diagram of a particular embodiment of a data processing system 100 that performs error correction is illustrated. Components of the data processing system 100 may all be combined on a single integrated circuit, in which case the data processing system 100 may be referred to as a system-on-a-chip (SOC). The data processing system 100 includes a bus master 102 having an input and an output. The bus master 102 may be a processor, a direct memory access (DMA) device, or other device capable of initiating access to or from a memory.

The data processing system 100 further includes an address bus 114. The address bus 114 is connected to the output of the bus master 102. The data processing system 100 also includes a memory device 104 and a memory device 106. The memory devices 104 and 106 each include inputs connected to the address bus 114 and each include first and second outputs. Each of the memory devices 104 and 106 can be a non-volatile memory device, such as a flash memory device, a dynamic RAM (DRAM) device, a static RAM (SRAM) device, or other type of memory device. The memory devices 104 and 106 can each be a different type of memory device. In addition, although the data processing system 100 is shown as having two memory devices for illustrative purposes, it will be appreciated that the data processing system 100 may incorporate any number of memory devices.

Further, the data processing system 100 includes an error correction calculation module 108 having inputs connected to the first outputs of the memory device 104 and the memory device 106. In addition, the error correction calculation module 108 includes an output. The error calculation module 108 includes a hardware module comprised of combinational logic elements for calculating error correction data (not shown).

The data processing system 100 also includes a bus interface 110 having inputs connected to the first outputs of the memory devices 104 and 106. In addition, the bus interface 110 includes an output. The bus interface may include a cross bar switch or other appropriate bus interface device as will be described with respect to FIG. 2, below.

The data processing system 100 further includes an error correction module 112 having a first input connected to the output of the bus interface 110 and a second input connected to the output of the error correction calculation module 108. The error correction module 112 also includes an output connected to the input of the bus master 102.

During operation, the bus master 102 accesses the memory devices 104 and 106 synchronously. Accordingly, the timing of operations of the bus master 102, the bus interface 110, and the memory devices 104 and 106 are synchronized by a device clock signal. In addition, access to the memory devices 104 and 106 typically takes place over a number of operational phases of the data processing system 100. Each operational phase may require one or more cycles of the device clock signal. Further, in alternative particular embodiments, the data processing system 100 can operate asynchronously.

For example, when the bus master 102 retrieves data from one of the memory devices 104 and 106, the retrieval occurs in three operational phases: an address phase; a data retrieval phase; and a data transfer phase. According to one aspect of the present disclosure, error processing, including calculation of error correction data and correction of raw data, takes place during the data transfer phase, rather than the data retrieval phase. Accordingly, error processing is performed in parallel with transferring the data from the bus interface 110 to the error correction module 112 and to the bus master 102. By moving error processing from the data retrieval phase to the data transfer phase, the amount of time the bus master 102 must wait for error corrected data is reduced, thereby improving the efficiency of the data processing system 100.

During the address phase, the bus master 102 initiates the access by providing an address to the memory devices 104 and 106 via the address bus 114. Each of the memory devices 104 and 106 includes a plurality of memory locations, each memory location associated with an address. Accordingly, if the memory device 104 determines that the address sent by the bus master 102 is associated with one of its memory locations, it will transfer the raw data stored at the memory location to the bus interface 110. The memory device 106 operates in similar fashion.

During the data retrieval phase, the raw data sent by either the memory device 104 or the memory device 106 is latched at the bus interface 110. In some conventional systems, error processing is performed prior to latching data at the bus interface 110. This increases the time required for the data retrieval phase, thereby lengthening the data latency and reducing device throughput and overall system performance. For example, the bus master 102 typically enters a wait state until it has received the data retrieved from the memory device 104 or the memory device 106. By performing error processing in parallel with multiplexing data from other memory devices, the number of wait states can be decreased, thereby improving the performance of the data processing system 100.

During the data transfer phase, the raw data is sent from the bus interface 110 to the error correction module 112. This transfer operation can include making the latched data available to the error correction module 112. Also during the data transfer phase, the error correction calculation module 108 retrieves error correction information from the memory device that is providing the raw data. In a particular embodiment, the error correction information may be an error correction syndrome associated with the raw data. The error correction calculation module 108 calculates error correction data associated with the raw data.

During the data transfer phase, the error correction module receives the error correction data from the error calculation module 108 and applies the error correction data to the raw data received from the bus interface 110 to produce error corrected data. The error corrected data is provided to the bus master 102 during the data transfer phase. The bus master 102 can then repeat the described operations to retrieve additional data from the memory devices 104 and 106.

It will be appreciated that, although the operation of the data processing system 100 has been described with respect to three phases of operation for illustrative purposes, the data processing system 100 may, in alternative particular embodiments, operate in more than or fewer than three operational phases.

Figure 2:
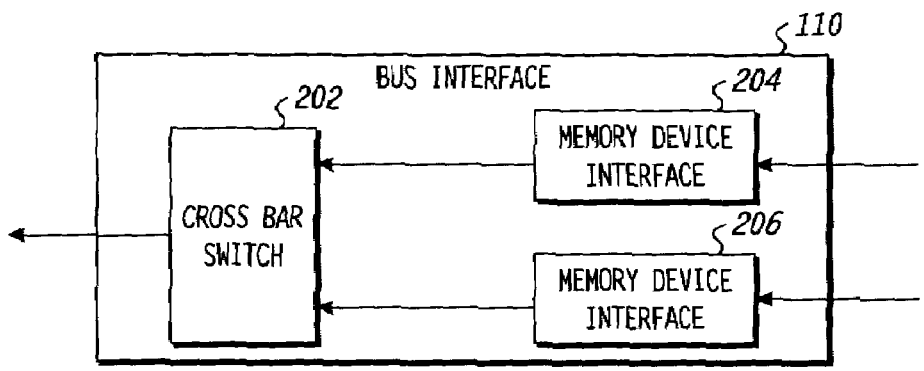
FIG. 2 is a block diagram of the bus interface illustrated in FIG. 1.

Referring to FIG. 2, a block diagram of the bus interface 110 illustrated in FIG. 1 is depicted. The bus interface 110 includes a cross bar switch 202, a memory device interface 204, and a memory device interface 206. The cross bar switch 202 includes two input connections and an output. The memory device interface 204 includes an input connection from a memory device (not shown), such as the memory device 104 of FIG. 1. The memory device interface 204 also includes an output connected to an input of the cross bar switch 202. The memory device interface 206 includes an input connection to a different memory device than is connected to the memory device 204, such as the memory device 106 of FIG. 1. The memory device interface 206 further includes an output connection connected to an input of the cross bar switch 202. The memory device interface 204 and the memory device interface 206 typically contain latches (not shown) to allow memories to be accessed efficiently in a pipelined fashion.

During operation, the memory device interface 204 and the memory device interface 206 communicate with their respective memory devices. The memory device interface 204 and the memory device interface 206 can each interface with a different type of memory device. For example, the memory device interface 204 can interface with a flash memory device while the memory device interface 206 can interface with a RAM device.

During the data retrieval phase described with respect to FIG. 1, raw data from the appropriate memory device is latched at the memory device interface associated with the memory device. The memory device interface can perform the necessary operations to ensure that the raw data is retrieved and latched. These operations can vary depending on the type of memory associated with the memory device interface.

Once the raw data has been latched at the memory device interface 204 or the memory device interface 206, the cross bar switch 202 transfers the raw data to the error correction module. As described above with respect to FIG. 1, the cross bar switch 202 transfers the raw data during a data transfer phase. The cross bar switch 202 includes a multi-port switch that allows multiple master devices to communicate to multiple slave devices concurrently over a bus and is designed to reduce bus arbitration delays.

Figure 3:
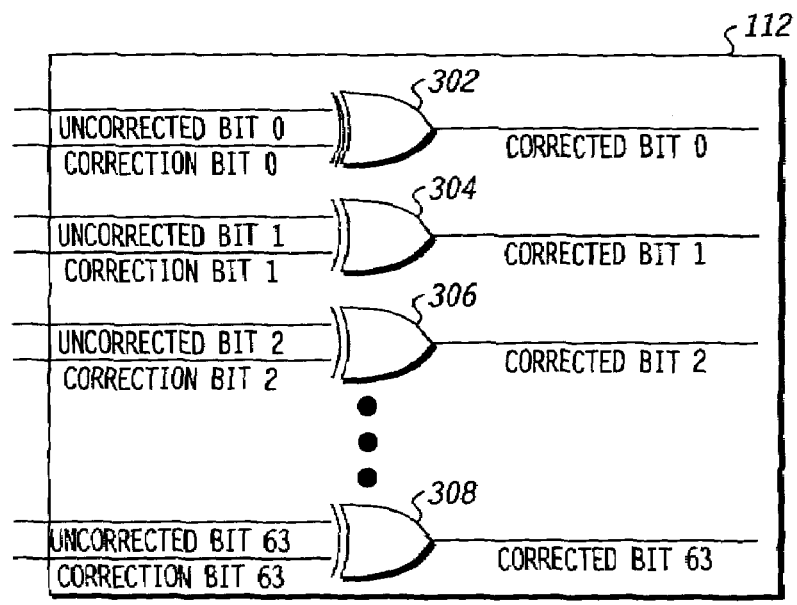
FIG. 3 is a block diagram of an error correction module illustrated in FIG. 1.

Referring to FIG. 3, a block diagram of a particular embodiment of the error correction module 112 of FIG. 1 is illustrated. The error correction module 112 includes a plurality of XOR gates (e.g. sixty-four XOR gates, including XOR gates 302, 304, 306, and 308). The XOR gate 302 includes a first input to receive a first uncorrected bit labeled "Uncorrected Bit 0", a second input to receive a first correction bit labeled "Correction Bit 0" and an output to provide a corrected data bit, labeled "Corrected Bit 0." The XOR gates 304-308 are each configured in a similar fashion to receive additional uncorrected bits and correction bits, and to provide additional corrected bits as illustrated in FIG. 3.

During operation, the XOR gates 302-308 receive separate individual bits of an uncorrected, or raw, 64-bit data word. This raw data word is received from a bus interface, such as the bus interface 110 illustrated in FIG. 2. The XOR gates 302-308 also each receive a correction bit associated with the received data bit. An error correction calculation module, such as the error correction calculation module 108 of FIG. 1, provides these correction bits. In the illustrated configuration, the correction bit is asserted when an error is detected for the associated uncorrected data bit. This ensures that the XOR gate associated with the uncorrected data bit will produce an output that is the inverse of the data bit, thereby providing a corrected data bit. The outputs of the XOR gates 302-208 thus provide corrected data to the bus master 102. One of skill in the art will appreciate that the illustrated embodiment uses a single level of logic to perform error correction, allowing for rapid correction of errors. This also allows both error calculation and error correction to be performed during the data transfer phase, as discussed with respect to FIG. 1.

In alternative embodiments, the error correction module 112 may be implemented in other ways. For example, the error correction module 112 can include different combinational logic implementations.

Figure 4:
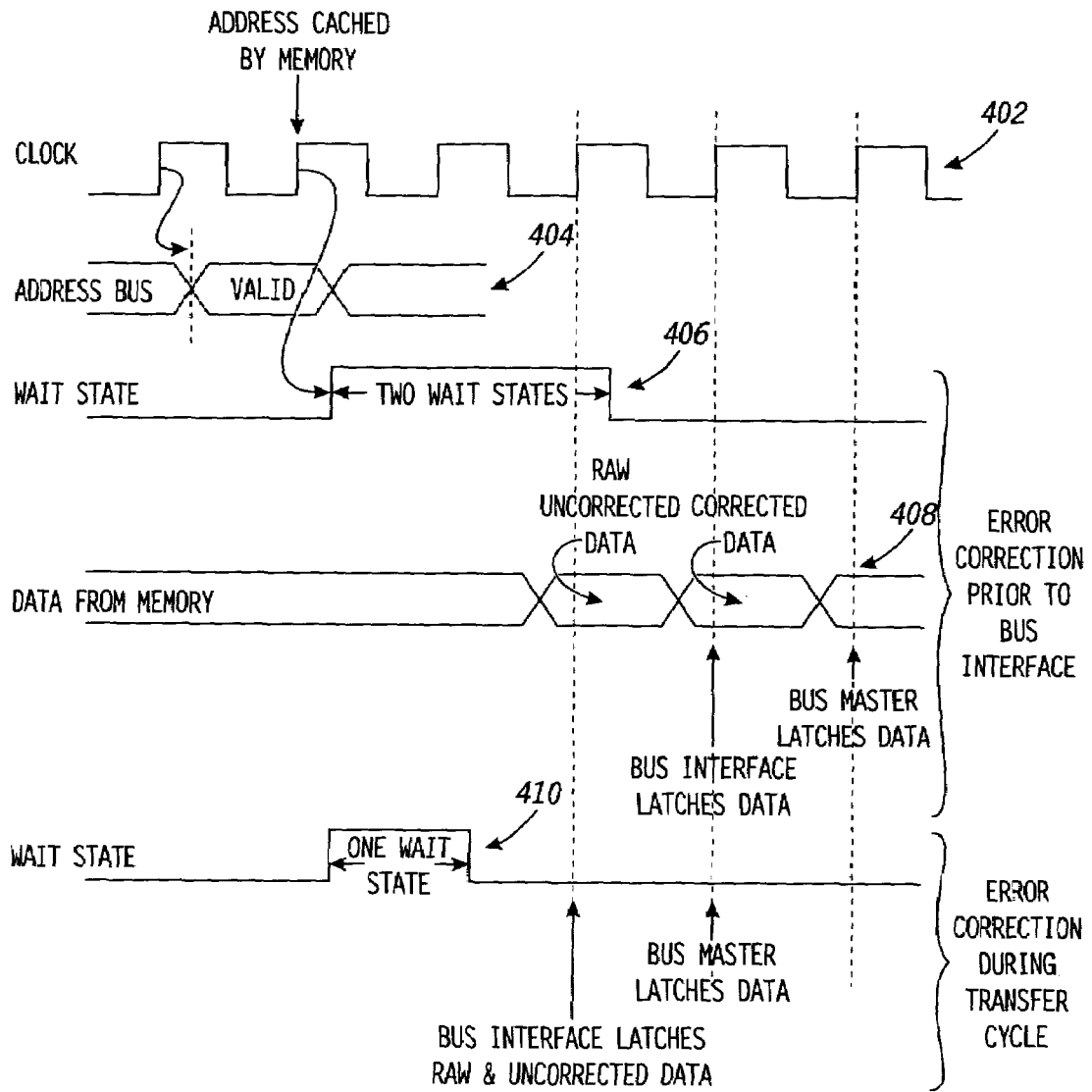
FIG. 4 is a diagram of a particular timing arrangement for the device illustrated in FIG. 1.

Referring to FIG. 4, a diagram of a particular timing arrangement for the data processing system 100 illustrated in FIG. 1 is depicted. The diagram illustrates a clock signal 402 having multiple edges. The diagram further illustrates an address phase timing signal 404, a wait state signal 406, a data state signal 412, and a wait state signal 410. The wait state signal 406 illustrates the number of wait states for a conventional system that performs error correction prior to providing data to a bus master, while the wait state signal 410 illustrates the number of wait states for a system that performs error correction during a data transfer phase.

As illustrated, valid data is placed on an address bus after a first edge of the clock signal 402. In response to a second edge of the clock signal 402, the wait state signal 406 indicates that the associated system undergoes two wait states before corrected data is latched at a bus interface. The data latched at the bus interface is latched at the bus master on the next rising edge of the clock signal 402.

In contrast, as illustrated by the wait state signal 410, the system that performs error correction during the transfer cycle undergoes only one wait state. After the wait state, the bus interface latches the raw uncorrected data and, at the next rising edge of the clock signal 402, corrected data is latched at the bus master. Accordingly, as illustrated, the system that performs error correction during a transfer cycle is able to latch data at the bus master at least one clock cycle more quickly than a system which performs error correction prior to latching the data at a bus interface. Alternate embodiments may use different timing arrangements from the arrangement illustrated in FIG. 4.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the scope of the disclosure.

What is claimed is:

1. A method comprising:
    retrieving first uncorrected data from a first memory device during a first operational phase;
    calculating first error correction data based on first error correction code (ECC) data associated with the first uncorrected data, the error correction data calculated during a second operational phase different from the first operational phase;
    outputting the first uncorrected data from a bus interface device during the second operational phase, the bus interface device coupled between a bus and a plurality of different memory devices;
    providing the first error correction data and the first uncorrected data to an error correction module during the second operational phase;
    performing error correction on the outputted first uncorrected data based on the first error correction data at the error correction module during the second operational phase to determine first corrected data; and
    providing the first corrected data to a bus master during a third operational phase.

2. The method of claim 1, wherein retrieving the first uncorrected data includes latching the first uncorrected data during the first operational phase.

3. The method of claim 1, wherein the first memory device is selected from the group consisting of a non-volatile memory device, a dynamic random access memory (RAM) device, and a static RAM device.

4. The method of claim 3, wherein the first memory device is a flash memory device.

5. The method of claim 1, further comprising:
    retrieving second uncorrected data from a second memory device during a fourth operational phase;
    calculating second error correction data based on second error correction code (ECC) data associated with the second uncorrected data, the second error correction data calculated during a fifth operational phase different from the fourth operational phase;
    performing error correction on the second uncorrected data based on the second error correction data, the error correction performed during the fifth operational phase.

6. The method of claim 5, wherein the first memory device is a non-volatile memory device and the second memory device is a volatile memory device.

7. The method of claim 1, wherein performing error correction on the first uncorrected data comprises combining the first uncorrected data and the first error correction data with an exclusive-OR (XOR) operation.

8. A method for error correction, comprising:
    receiving uncorrected data at a bus interface during a first operational phase, the bus interface adapted to be coupled between a bus and a plurality of different devices;
    receiving error correction data from an error correction code (ECC) module arranged substantially in parallel with the bus interface;
    performing error correction on the uncorrected data based on the error correction data to provide corrected data to the bus during a second operational phase.

9. The method of claim 8, wherein the bus interface includes a cross bar switch.

10. The method of claim 8, wherein the error correction data is a single bit of data.

11. The method of claim 8, wherein performing error correction comprises combining the uncorrected data and the error correction data with an exclusive-OR (XOR) operation.

12. The method of claim 8, further comprising:
    providing error corrected data based on the uncorrected data to a bus master.

13. A device, comprising:
    a first memory device;
    an error correction code (ECC) module comprising a first input coupled to the first memory device and an output;
    a bus interface arranged substantially in parallel with the error correction module, the bus interface comprising a first input to receive first uncorrected data from the memory and an output;
    a logic module comprising a first input coupled to the output of the bus interface to receive the first uncorrected data, a second input coupled to the output of the ECC module to receive error correction data, and an output to provide error corrected data.

14. The device of claim 13, wherein the first memory device is a non-volatile memory device.

15. The device of claim 14, wherein the first memory device is a flash memory device.

16. The device of claim 13, further comprising:
    a bus master coupled to the output of the logic module to receive the error corrected data.

17. The device of claim 16, wherein the first memory device and the bus master are incorporated in a system-on-a-chip (SOC).

18. The device of claim 13, wherein the logic module further comprises an exclusive-or (XOR) gate comprising a first input coupled to the first input of the logic module, a second input coupled to the second input of the logic module, and a first output coupled to the output of the logic module.

19. The device of claim 13, further comprising:
    a second memory device;
    wherein the bus interface further comprises a second input to receive raw data from the second memory device, the ECC module further comprises a second input coupled to the second memory device to receive second uncorrected data.

20. The device of claim 19, wherein the first memory device and the second memory device are different types of memory devices.

* * * * *